Sept. 23, 1930.  E. C. FULKERSON  1,776,553
DAIRY PRODUCT ORDER INDICATOR
Filed Sept. 28, 1929
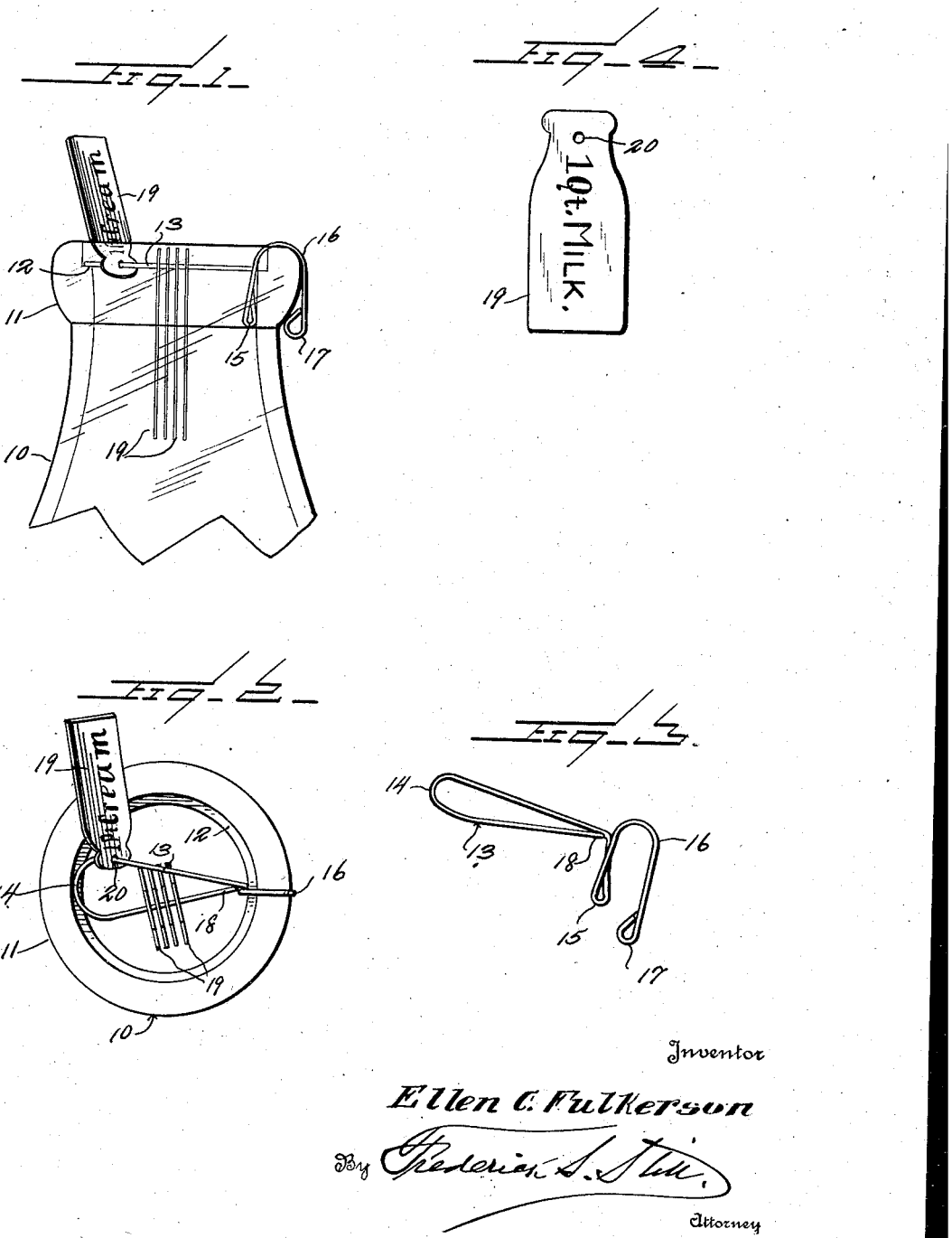
Inventor
Ellen C. Fulkerson
By Frederick S. Hill
Attorney Patented Sept. 23, 1930

1,776,553

UNITED STATES PATENT OFFICE

ELLEN CROSS FULKERSON, OF CARBONDALE, PENNSYLVANIA

DAIRY-PRODUCT ORDER INDICATOR

Application filed September 28, 1929. Serial No. 395,961.

The present invention relates to improvements in milk order indicators which are adapted to notify the deliverer of the exact quantity of milk or other dairy product desired.

An object of this invention is to provide a device which will eliminate the necessity of the customer writing the message and placing the same within the bottle.

Another object of this invention is to provide a device of this character which cannot be blown away by the wind and which will not be lost even though the bottle is knocked over by wind or the like.

A still further object of this invention is to provide an indicator which can easily and readily be placed in the top of any bottle and if desired removed from the empty bottle by the milk driver or an empty bottle may be provided by the dairy and used by the customer with the indicator for showing the quantity of milk or other dairy products desired.

The above and various other objects and advantages of this invention will in part, be described in and in part be understood from the following detailed description of the present preferred embodiment, the same being illustrated in the accompanying drawing, wherein:—

Figure 1 is a detailed front elevation of a milk bottle having a milk order indicator construction according to the present invention mounted in the top thereof;

Figure 2 is a top plan view of the bottle showing the device mounted therein;

Figure 3 is a side elevation of the indicator holder;

Figure 4 is a front elevation of the milk order indicator.

Referring to the drawing, the numeral 10 designates a standard milk bottle having a top 11 which is of the usual construction and is provided interiorly thereof adjacent the top with a cap seat 12. The seat 12 as is usual in standard milk bottles, extends substantially downward from the top of the bottle. A dairy product order holder generally designated as 13 is adapted to seat at its outer end 14 upon the cap seat 12. The order holder 13 is preferably constructed of metal or the like and in the present preferred embodiment, a substantially yielding wire is used so as to provide a substantially rigid body and at the same time a body which is flexible.

The holder 13 is provided at its rear end portion with a pair of downwardly extending gripping members 15 and 16. The gripping member 15 is adapted to extend downward into the inside of the bottle and the gripping member 16 extends downwardly over the top of the bottle at the outside thereof and has an inwardly extending loop portion 17 which is adapted to engage the curved portion of the bottle top so as to firmly hold the device on the top of the bottle.

The body portion of the holder is preferably constructed in the form of a loop, one end of which is free as at 18, the free end 18 being adapted to bear against the opposite end portion of the body to close the loop.

A plurality of order indicators 19 are adapted to be loosely mounted on the body portion of the holders 13, being placed thereon by extending the free end 18 through openings 20. The order indicators 19 may be constructed of any suitable material such as celluloid, cardboard, metal or the like but in the present preferred embodiment, these indicators are preferably constructed of celluloid and suitable indicia placed upon different indicators to designate the kind and quantity of dairy products desired.

It will, of course, be understood that if desired the indicators may be colored in any suitable manner so that the orders for milk may be of one color, cream of another color and other dairy products of any color desired.

The indicators 19 are adapted to be suspended within the top of the bottle 10 and in order to designate the kind and quantity of dairy products desired, the customer merely removes the holder from the bottle and swings one of the indicators upwardly so that the indicator will stand substantially outside of the top of the bottle, the indicator 19 being of a size so that when it is swung upwardly on its pivot, it will not fall back into the top of the bottle but will rest at one end on the holder 13 and the opposite end portion will extend outwardly of the top of the bottle substantially in a horizontal position.

It will be noted from this construction that when one of the indicators has been raised upwardly and the holder snapped back into the top of the bottle, the indicator is readily visible by the milk driver and the order cannot be changed by knocking the bottle over or in any other manner disturbing the bottle.

If desired, a separate bottle may be used for mounting the order indicator but this is not at all necessary in view of the fact that the order indicator is readily removed from the empty bottle so that when the driver has delivered the quantity of dairy products desired, the indicator can be removed therefrom and placed beside the delivered products.

It will, of course, be understood that various changes and modifications may be made in the details of construction and design of the specifically described embodiment of the invention without departing from the spirit thereof, such changes and modifications being restricted only by the scope of the following claims.

I claim:—

1. A dairy product order indicator comprising a holder, clamping resilient means engaging the flanged top of the bottle for removably securing said holder through and across the open end thereof, and a plurality of dairy product order indicators loosely mounted on said holder, said order indicators normally depending within the top of the bottle and being adapted to be swung upwardly and outwardly into substantially horizontal position.

2. A dairy product order indicator comprising a holder, yieldable means secured to the said holder for removably securing the holder to the flanged top of a bottle, said holder being adapted to rest in the cap seat of the bottle, and a plurality of depending dairy product order indicators loosely mounted on said holder.

3. A dairy product order indicator comprising a holder adapted to be removably mounted in the top of a bottle, said holder comprising a loop member having free inner ends, yielding means secured to one of said free ends of the holder for removably mounting the holder in the top of the bottle, the other of said free ends being bent inwardly so as to close the loop, and a plurality of order indicators loosely mounted on said loop, said order indicators having indicia thereon to indicate the dairy products desired.

In testimony whereof I affix my signature.

ELLEN CROSS FULKERSON.